(No Model.) 2 Sheets—Sheet 1.

J. H. OCKERSHAUSEN.
LIQUID STRAINER FOR PURIFYING SUGAR, &c.

No. 336,425. Patented Feb. 16, 1886.

WITNESSES:
Otto Hufeland
William Miller

INVENTOR
John H. Ockershausen
BY Van Santvoord & Hauff
his ATTORNEYS (No Model.) 2 Sheets—Sheet 2.

J. H. OCKERSHAUSEN.
LIQUID STRAINER FOR PURIFYING SUGAR, &c.

No. 336,425. Patented Feb. 16, 1886.

WITNESSES:
Otto Hufeland
William Miller

INVENTOR
John H. Ockershausen
BY
Van Santvoord & Hauff
his ATTORNEYS

UNITED STATES PATENT OFFICE.

JOHN H. OCKERSHAUSEN, OF GREENWICH, CONNECTICUT.

LIQUID-STRAINER FOR PURIFYING SUGAR, &c.

SPECIFICATION forming part of Letters Patent No. 336,425, dated February 16, 1886.

Application filed September 24, 1885. Serial No. 178,102. (No model.)

*To all whom it may concern:*

Be it known that I, JOHN H. OCKERSHAUSEN, a citizen of the United States, residing at Greenwich, in the county of Fairfield and State of Connecticut, have invented new and useful Improvements in Liquid-Strainers for Purifying Sugar, &c., of which the following is a specification.

This invention relates to liquid-strainers, and it is applicable to the straining and purifying of sugars in a liquid state.

The invention comprises a cylinder within which is placed an annular strainer, so made and arranged that it can be readily inserted into and removed from the cylinder when desired, and so that an annular chamber is formed between the strainer and the inner surface of the cylinder. The liquid is conducted into the strainer and allowed or compelled to pass through its meshes into the annular chamber, from which it is drawn off through a discharge-pipe. Below the cylinder is a funnel-shaped vessel, which connects at its lower end with a receiver, in which are collected the foreign matter and refuse separated from the liquid by the meshes of the strainer. The receiver is emptied from time to time through a suitable discharge-pipe or man-hole. The funnel-shaped vessel incloses an inner vessel of corresponding form, which receives the refuse and foreign matter arrested by the strainer and conducts the same to the receiver, being assisted in that work by a spiral conductor or conveyer arranged around the lower part of a vertical shaft which revolves in it. Said shaft extends upward through the strainer and carries brushes which come in contact with the inside surface of the strainer and clear it of the separated matters that cling to it. When the meshes of the strainer become clogged, I clean them by means of steam, which I admit through a pipe in the side of the cylinder, so that the steam enters the meshes of the strainer from the outer side. Before applying the steam for this purpose I draw off the liquid from the strainer and the annular chamber surrounding it.

The novel features of the apparatus are more particularly pointed out in the following description and claims, reference being had to the accompanying drawings, in which—

Figure 1:
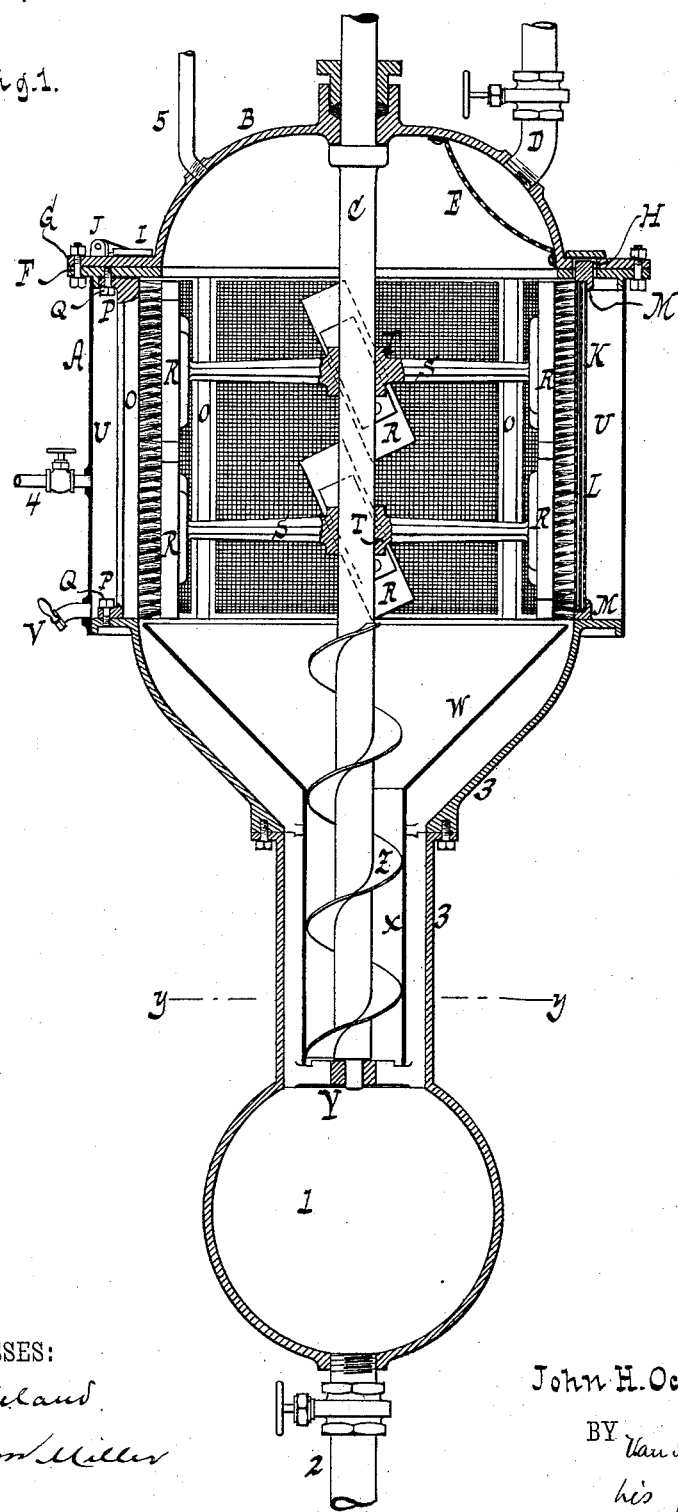
Figure 2:
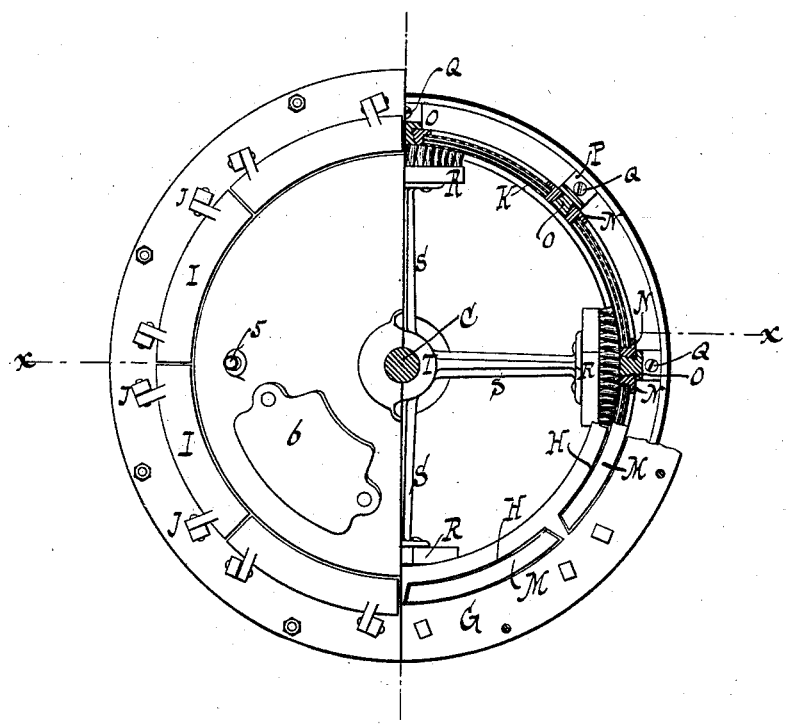
Figure 3:
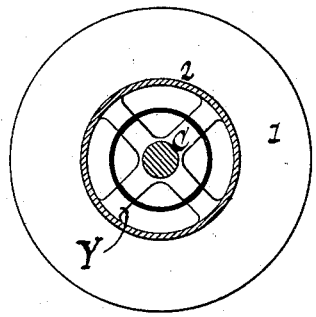

Figure 1 is a vertical central section in the line *x x*, Fig. 2. Fig. 2 is a plan view, partly in section. Fig. 3 is a horizontal section in the line *y y* of Fig. 1.

Similar letters indicate corresponding parts.

The letter A designates a vertical cylinder, open at top and bottom. It is here represented as supported upon the funnel-shaped vessel and receiver below; but it may be supported in any convenient manner. The cylinder A is provided with a cover, B, preferably dome-shaped, through which passes the brush-shaft C, the joint made by its passage being closed by a stuffing-box, as shown. The shaft is turned by any suitable means. Such means may be applied to it above the stuffing box.

D is an inlet-pipe entering the cover, for supplying the liquid to be strained to the apparatus. The place where it enters the cover is surrounded by a perforated plate or rose, E, which distributes the liquid as it enters the strainer. The plate E is made removable, so that it can be taken out and cleaned as occasion requires. The cylinder A, on its upper end, is provided with a flange, F, on which rests the flange G of the cover. The cover is bolted or properly secured to the cylinder. Both flanges are provided with curved openings H, through which are inserted the divisions of the strainer, when it is made in divisions, as is the case in this example. The openings H are provided with covers I, that are connected to the flange of the cover by hinges J. The strainer in this example is made in segments or divisions K, which are curved so that when all are in place they form a continuous circular strainer of whose curve the brush-shaft C is the center. The meshes L of the strainer are arranged in one or more layers, as may be desired. In this example I have shown it as composed of three layers. The meshes are properly secured in frames, whose lower and upper ends are designated by the letter M, and their sides by the letter N. The frames are guided to their places in the apparatus and held therein by guides O, which are secured to the cylinder by screws P, that pass through top and bottom flanges Q of the guides. The brush-shaft C, where it passes through the strainer, carrries brushes R, which are arranged diagonally in this example and in two series—an upper and a lower. The brushes are supported by arms S, which extend from hubs T, fixed on the shaft C. The brushes are intended to clear the inner surface of the strainer of the refuse and foreign matter that may cling to it. Between the strainer and the inner side of the cylinder is formed an annular chamber, U, into which the liquid that passes through the meshes of the strainer is discharged. The liquid is drawn off from the chamber U through a pipe and faucet, V. Directly below the strainer, and so situated that it will receive the matter which is brushed off from the strainer and that which is separated by it from the liquid, is a funnel-shaped vessel, W, whose lower tubular part, X, extends downward to the top of the receiver 1. The brush-shaft extends downward through the tube X, and is supported in a step, Y. The part of the shaft which is below the brushes is provided with a screw-conveyer, Z, of such a diameter as to be nearly equal to the inside diameter of the tube. The office of the screw Z is to conduct the solid matter and refuse which is removed from the strainer by the brushes and that which is separated from the liquid by the strainer through the vessel W into the receiver, whence it is removed by means of the pipe 2. The vessel W is surrounded by an outer vessel, 3, of similar shape, which communicates with the interior of the receiver.

In operating the apparatus the pipes V and 2 are closed and the pipe D opened, and the liquid to be purified is introduced into the apparatus through the pipe D, so as to fill the receiver 1, the inner and outer vessels, W and 3, and the strainer. The liquid will at once begin to run through the meshes of the strainer into the surrounding chamber U, whence it is drawn by means of pipe V. Motion is given to the shaft C, so as to cause the brushes to act on the inner surface of the strainer. The movements of the brushes accelerate the passing of the liquid through the meshes of the strainer, and by rubbing against the strainer tend to clear its inside surface from the refuse matter which may cling to it, which, together with all foreign matter which is separated from the liquid by the strainer, falls into the vessel W below, whence it is forced by the propeller-screw Z into the receiver 1. The solid and semi-solid matter which collects in the receiver displaces the liquid which is present in it, and such liquid is free to rise in the vessels W and 3 and to mingle with the fresh liquid that is continually supplied to the apparatus through the pipe D. When the meshes of the strainer require to be cleansed, the liquid in the apparatus is drawn off sufficiently to clear the chamber U, and the interior of the strainer and the pipe D is closed, when steam is admitted into the chamber U, so as to penetrate the meshes of the strainer from their outer side and pass through them into the strainer, thereby tending to remove all matter which may clog them. The steam-pipe 4 is provided for that purpose in the side of the cylinder A, and in the cover B, I have placed a steam-escape pipe, 5, which may be opened while steam is admitted through the pipe 4.

I do not restrict myself to a cylindrical form for the strainer, as it may be made tapering, with its greatest diameter uppermost, in which case the divisions of the strainer and the guides in which they are placed will be made tapering in width from top to bottom.

If desired, the strainer may be made in one piece, instead of in divisions, without departing from my invention.

I can subject the liquid in the apparatus to pressure, so as to force the liquid through the strainer with more or less force, by closing the discharge-pipe 2 and closing the pipes 4 and 5 and then applying pressure to the contents of the strainer through the supply-pipe D.

The figure 6 is a cover for a man-hole made in the cover B.

What I claim as new, and desire to secure by Letters Patent, is—

1. The combination of the strainer K, the revolving brushes R, acting upon the inside of the strainer, the cylinder A, and the annular chamber U, formed between it and the strainer and provided with a discharge-pipe, V, substantially as shown and described.

2. The combination of the strainer K, the revolving brushes R, the spiral conveyer Z, and the receiver 1, substantially as described.

3. The combination of the strainer K, the cylinder A, inclosing the strainer, the annular chamber U, formed between them, and the pipe 4, for injecting steam into the annular chamber, substantially as described.

4. The combination of the strainer K, the revolving brushes R, the receiver 1, the supply-pipe D, and means for exposing the liquid in the strainer to pressure, substantially as described.

5. The strainer K, when made in divisions, in combination with the guides O and openings H, substantially as shown and described.

In testimony whereof I have hereunto set my hand and seal in the presence of two subscribing witnesses.

JOHN H. OCKERSHAUSEN. [L. S.]

Witnesses:
OTTO HUFELAND,
WILLIAM MILLER.